(12) United States Patent
Esswie

(10) Patent No.: US 12,483,983 B2
(45) Date of Patent: Nov. 25, 2025

(54) CONTROL CHANNEL RESOURCE OPTIMIZATION IN A RADIO ACCESS NETWORK

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 17/866,216

(22) Filed: Jul. 15, 2022

(65) Prior Publication Data

US 2024/0023021 A1    Jan. 18, 2024

(51) Int. Cl.
*H04W 52/02*    (2009.01)
*H04L 1/00*    (2006.01)
*H04W 72/1273*    (2023.01)

(52) U.S. Cl.
CPC ....... *H04W 52/0229* (2013.01); *H04L 1/0038* (2013.01); *H04W 72/1273* (2013.01)

(58) Field of Classification Search
CPC ......... H04W 52/0229; H04W 72/1273; H04W 52/0216; H04W 72/23; H04L 1/0038; H04L 1/0004; H04L 1/001; H04L 1/0045; H04L 1/0072; H04L 5/0058; H04L 5/0053; H04L 5/0094
See application file for complete search history.

(56) References Cited

U.S. PATENT DOCUMENTS

| | | | |
|---|---|---|---|
| 2009/0088148 A1* | 4/2009 | Chung | H04L 1/0032 455/423 |
| 2018/0167920 A1* | 6/2018 | Kim | H04L 1/0038 |
| 2021/0111848 A1* | 4/2021 | Chen | H04L 5/0053 |
| 2021/0392584 A1* | 12/2021 | Reial | H04W 76/28 |
| 2023/0319830 A1* | 10/2023 | Liang | H04L 27/26025 370/329 |
| 2024/0306166 A1* | 9/2024 | Babaei | H04W 76/40 |

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Kouroush Mohebbi
(74) *Attorney, Agent, or Firm* — Amin, Turocy & Watson, LLP

(57) ABSTRACT

A UE is configured to monitor a first control channel search space and information retrieved therefrom is used to not only decode data traffic having a first characteristic but to decode a second search space. Information retrieved from the second search space is used to decode data traffic having a second characteristic that is different from the first characteristic. The different characteristics may be different QoS levels and/or flow/service priority levels. The UE may be configured to decode the first downlink control channel search space according to a device-specific scrambling code specific to the UE or according to a service-type-specific scrambling code. The UE may monitor and decode a wake-up indication control channel search space to determine whether to wake up and monitor the first control channel search space.

20 Claims, 13 Drawing Sheets

(56) References Cited

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.300—"5G; NR; NR and NG-RAN Overall description; Stage-2" 3GPP TS 38.300 version 16.4.0 Release 16, Jan. 2021, 151 pages.
3GPP. "3rd Generation Partnership Project; Technical Specification Group Services and System Aspects; Release 17 Description; Summary of Rel-17 Work Items (Release 17)" 3GPP TR 21.917 V17.0.1, Jan. 2023, 167 pages.

\* cited by examiner

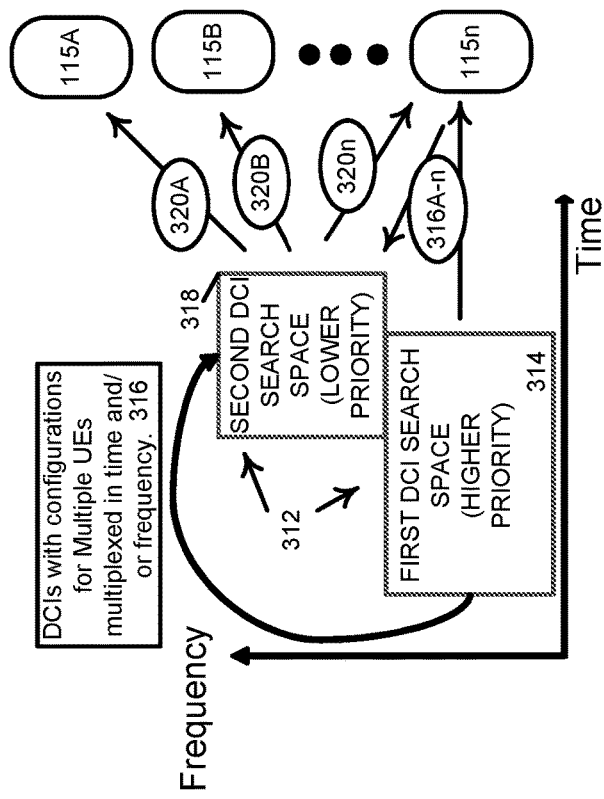
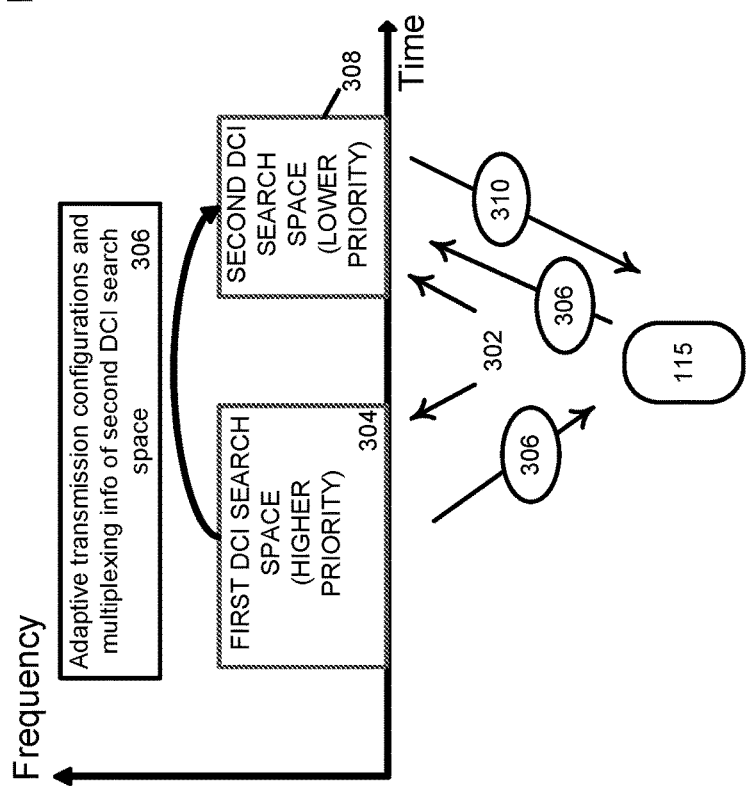
FIG. 3A
FIG. 3B
FOR FIGS. 3A AND 3B: FIRST CONTROL CHANNEL SEARCH SPACE COMPRISES FIRST DCI CORRESPONDING TO HIGHER PRIORITY TRAFFIC FLOW AS WELL AS SCHEDULING INFORMATION FOR SECOND SEARCH SPACE THAT CORRESPONDS TO LOWER PRIORITY TRAFFIC FLOWS

CONTROL CHANNEL RESOURCE OPTIMIZATION IN A RADIO ACCESS NETWORK

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, an example method may comprise monitoring, by a user equipment comprising a processor, a first downlink control channel search space. The first downlink control search space may be a search space that is provided by a RAN paging scheme in addition to a downlink control channel and the user equipment may be is configured to blindly decode the first downlink control channel search space, which may be decoded according to an assigned service and/or flow priority scrambling code, the blind decoding resulting in a blindly decoded first downlink control channel search space. The UE may retrieve second downlink control channel search space information from the blindly decoded first downlink control channel search space; monitor a second downlink control channel search space according to the second downlink control channel search space information; decode the second downlink control channel search space according to the second downlink control channel search space information, resulting in a decoded second control channel search space; retrieve scheduling information for a data traffic flow from the decoded second control channel search space; and decode the data traffic flow according to the scheduling information. The data traffic flow corresponding to the scheduling information may comprise data traffic of a VR session that the UE is facilitating.

The scheduling information for the data traffic flow may comprise second scheduling information for a second data traffic flow, wherein the first downlink control channel search space comprises first scheduling information that corresponds to a first data traffic flow having a first characteristic, and wherein the second data traffic flow corresponds to a second characteristic. The first characteristic may comprise a first quality of service that is associated with a first latency. The second characteristic may comprise a second quality of service that is associated with a second latency. The second latency may be greater than the first latency, for example the second latency may be a permitted latency for a lower priority VR traffic flow for facilitating a right portion or a left portion of a VR session and the first latency may be a required latency for a higher priority VR traffic flow for facilitating a center portion of the VR session.

The scheduling information for the data traffic flow may comprise second scheduling information for a second data traffic flow, and the example embodiment method may further comprise retrieving first scheduling information for a first data traffic flow from the first downlink control channel search space; and decoding the first data traffic flow according to the first scheduling information. Thus, the first search space may comprise information associated with a first data traffic flow and may also comprise information for use in decoding second search spaces that correspond to lower priority traffic that the first data traffic flow.

In an aspect of the example embodiment method the user equipment may be part of a service-type-specific group of user equipment that are configured to monitor and decode the first downlink control channel search space according to device-specific scrambling codes. An example may be a group of UE devices that are to be used for a given XR session.

The example embodiment method may further comprise monitoring a wake-up indication control channel search space; retrieving wake up information from the wake-up indication control channel search space; blindly decoding the wake-up information using a service-type-specific scrambling code and/or scrambling sequence, resulting in blindly decoded wake up information; analyzing the blindly decoded wake up information to result in analyzed decoded wake up information; and responsive to the analyzing the blindly decoded wake information, changing the user equipment from an idle mode to an active mode based on a determination that the analyzed decoded wake up information comprises an instruction for the user equipment to wake up, and decode the first control search space. It will be appreciated that the term 'idle' may refer to an inactive user equipment, which may be in a sleep mode or which may not be in a sleep mode.

The user equipment may be part of a service-type-specific group of user equipment that is configured to blindly decode the first downlink control channel search space according to a service-type-specific scrambling code and/or scrambling sequence, wherein the second downlink control channel search space information comprises a device-specific-scrambling code and/or scrambling sequence that is specific to the user equipment, and wherein the user equipment uses the device-specific-scrambling code to perform the decoding of the second downlink control channel search space.

The example embodiment method may further comprise monitoring a wake-up indication control channel search space; retrieving wake up information from the wake-up indication control channel search space and/or scrambling sequence; blindly decoding the wake-up information using the service-type-specific scrambling code, resulting in blindly decoded wake-up information; analyzing the blindly decoded wake up information to result in analyzed decoded wake-up information; and responsive to the analyzing the blindly decoded wake-up information, changing the user equipment from an idle mode to an active mode based on a determination that the analyzed decoded wake-up information comprises an instruction for the user equipment to wake-up.

In another example embodiment, a user equipment, which may be a smart phone, a tablet, a VR appliance, a smart television, a smart watch, a computer, and the like, may comprise a processor configured to monitor a first downlink control channel search space; blindly decode the first downlink control channel search space, resulting in a blindly decoded first downlink control channel search space; obtain second downlink control channel search space information from the blindly decoded first downlink control channel search space; monitor a second downlink control channel search space according to the second downlink control channel search space information; decode the second downlink control channel search space according to the second downlink control channel search space information, resulting in a decoded second control channel search space; obtain scheduling information for a data traffic flow from the decoded second control channel search space; and decode the data traffic flow according to the scheduling information.

The first characteristic may comprise a first quality of service that is associated with a first latency and/or reliability target, wherein the second characteristic comprise a second quality of service that is associated with a second latency and/or reliability target, and wherein the second latency is longer than the first latency.

The scheduling information for the data traffic flow may comprise second scheduling information for a second data traffic flow. The processor of the example embodiment UE may be further configured to obtain first scheduling information for a first data traffic flow from the first downlink control channel search space; and decode the first data traffic flow according to the first scheduling information.

The user equipment may part of a service-type-specific group of user equipment that are configured to monitor and decode the first downlink control channel search space according to device-specific scrambling codes and the processor thereof may be further configured to monitor a wake-up indication control channel search space; obtain wake up information from the wake-up indication control channel search space; blindly decode the wake-up information using a service-type-specific scrambling code, resulting in blindly decoded wake up information; perform an analysis of the blindly decoded wake up information to result in analyzed decoded wake up information; and based on a result of the analysis of the blindly decoded wake information, change the user equipment from an idle mode to an active mode based on a determination that the analyzed decoded wake up information comprises an instruction for the user equipment to wake up.

The user equipment may be part of a service-type-specific group of user equipment that is configured to blindly decode the first downlink control channel search space according to a service-type-specific scrambling code, wherein the second downlink control channel search space information comprises a device-specific scrambling code that is specific to the user equipment, and wherein the user equipment uses the device-specific-scrambling code to perform the decoding of the second downlink control channel search space. The processor may be yet further configured to monitor a wake-up indication control channel search space; obtain wake up information from the wake-up indication control channel search space; blindly decode the wake-up information using the service-type-specific scrambling code, resulting in blindly decoded wake-up information; perform an analysis of the blindly decoded wake-up information to result in analyzed decoded wake up information; and based on a result of the analysis of the blindly decoded wake-up information, change the user equipment from an idle mode to an active mode based on a determination that the analyzed decoded wake-up information comprises an instruction for the user equipment to wake-up.

In an example embodiment a non-transitory machine-readable medium, comprising executable instructions that, when executed by a processor of a mobile device coupled with a communication network, facilitate performance of operations, comprises monitoring a first downlink control channel search space; blindly decoding the first downlink control channel search space; determining second downlink control channel search space information from the blindly decoded first downlink control channel search space; monitoring a second downlink control channel search space according to the second downlink control channel search space information; decoding the second downlink control channel search space according to the second downlink control channel search space information; determining scheduling information for a data traffic flow from the decoded second control channel search space; and decoding the data traffic flow according to the scheduling information. The mobile device may be part of a service-type-specific group of mobile devices that are configured to monitor and decode the first downlink control channel search space according to device-specific scrambling codes.

The example non-transitory machine-readable medium may further configure the processor to perform operations comprising monitoring a wake-up indication control channel search space; determining wake up information from the wake-up indication control channel search space; blindly decoding the wake-up information using a service-type-specific scrambling code; analyzing the blindly decoded wake-up information to result in analyzed decoded wake-up information; and responsive to the analyzing of the blindly decoded wake-up information, changing the mobile device from an idle mode to an active mode based on a determination that analyzed decoded wake-up information comprises an instruction for the mobile device to wake up.

The mobile device may be part of a service-type-specific group of mobile devices that is configured to blindly decode the first downlink control channel search space according to a first service-type-specific scrambling code, wherein the second downlink control channel search space information comprises a device-specific-scrambling code that is specific to the mobile device, and wherein the mobile device uses the device-specific-scrambling code to perform the decoding of the second downlink control channel search space.

The non-transitory machine-readable medium may further configure the processor to perform operations that further comprise monitoring a wake up indication control channel search space; determining wake up information from the wake up indication control channel search space; blindly decoding the wake up information using a second service-type-specific scrambling code; analyzing the blindly decoded wake up information to result in analyzed decoded wake up information; and responsive to the analyzing of the blindly decoded wake up information, changing the mobile device from an idle mode to an active mode based on a determination that the analyzed decoded wake up information comprises an instruction for the mobile device to wake up.

BRIEF DESCRIPTION OF THE DRAWINGS

FIG. 3A illustrates an example priority-specific/service-specific control channel grant instance.

FIG. 3B illustrates another example priority-specific/service-specific control channel grant instance.

DETAILED DESCRIPTION OF THE DRAWINGS

Figure 1:
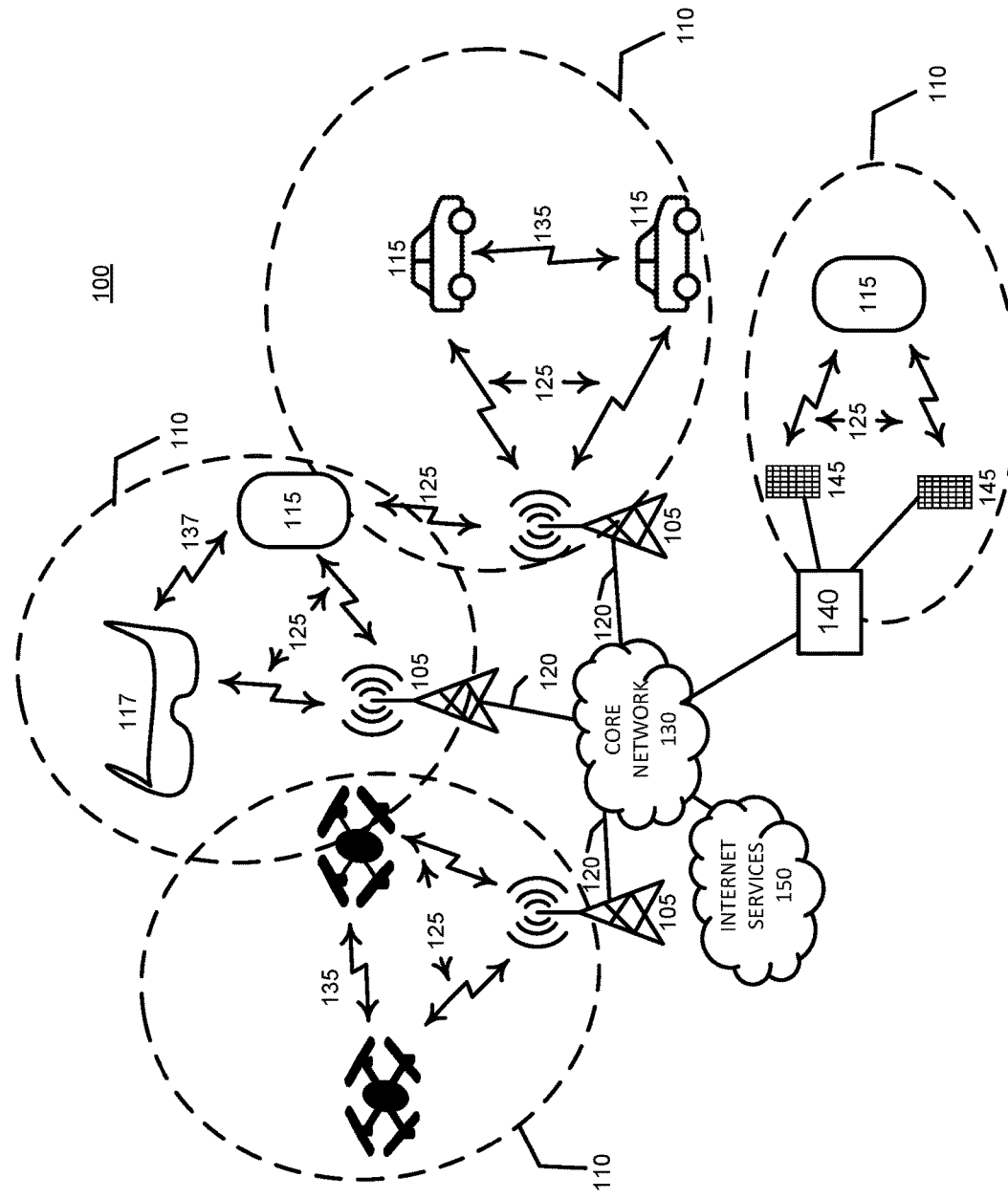
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass may consume NR radio resources at a given broadband data rate having more stringent radio latency and reliability criteria to provide a satisfactory end-user experience.

5G systems should provide support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (LAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g. an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D21) communications may utilize a one-to-many (1:M) system in which a UE transmits to every other UE in the group. In some examples, a base station 105 facilitates the scheduling of resources for D2D communications. In other cases. D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet. Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
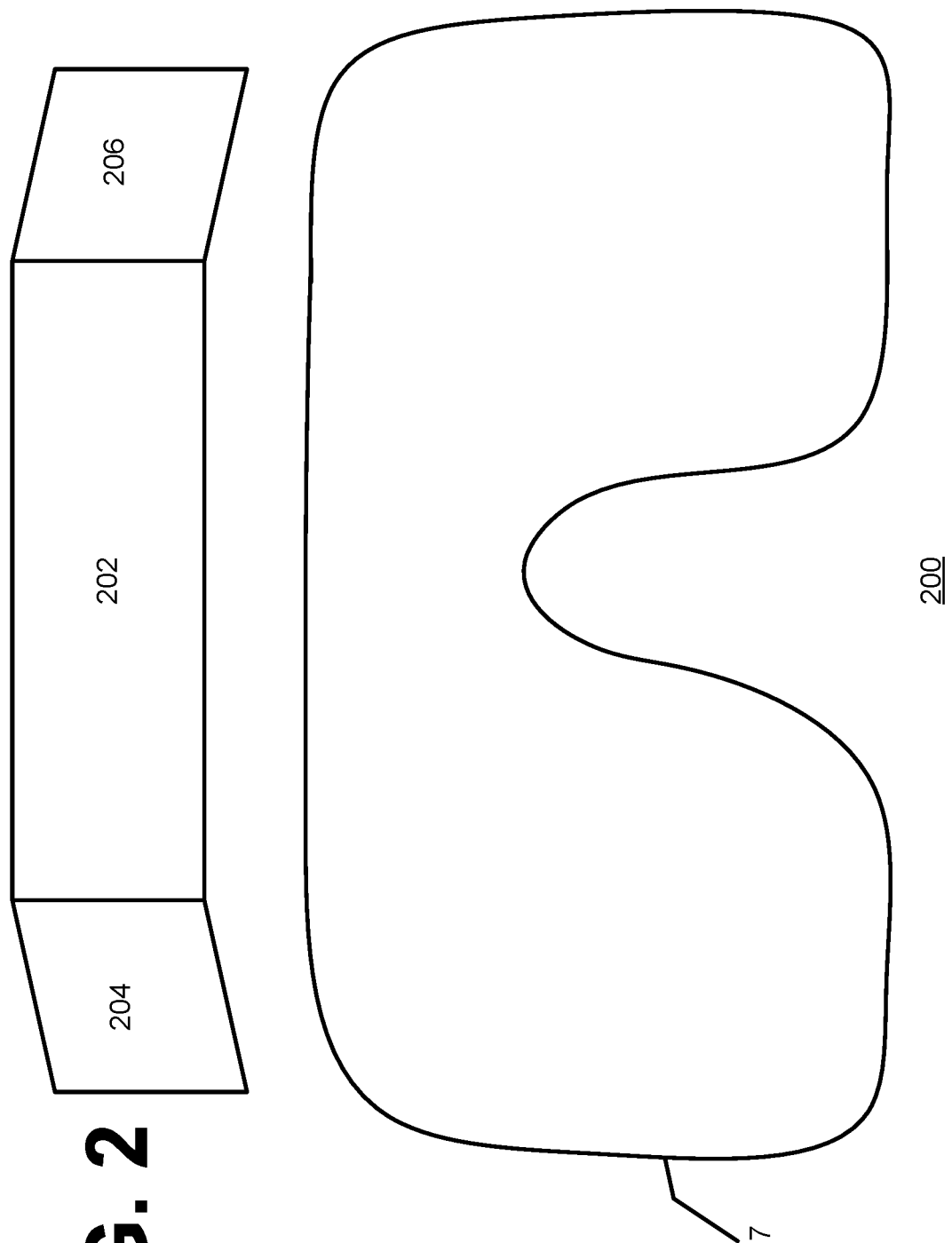
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center visual display portion 202 may be prioritized higher than a wireless data traffic flow carrying visual information for left visual display portion 204 or for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

The 5G PDCCH channel may be beamformed according to favored, preferred, or assigned, channel vectors associated with each UE using embedded demodulation-assisting demodulation reference signals ("DMRS"). The PDCCH may be modulated by a fixed quadrature phase shift keying ("QPSK") modulation scheme and with a conservative coding rate such as the reliability of receiving the PDCCH channel at the device is maximized. For instance, to fulfill the URLLC $10e$-5 reliability level, the PDCCH channel decoding ability must be enhanced at the device end.

The resource size of a given PDCCH channel, which may be carrying downlink control information messages ("DCI") corresponding to one or more UEs, may be time-varying based on a PDCCH aggregation level. To enhance PDCCH decoding a wireless communication network may increase the resource size of a PDCCH channel and accordingly adopt a more conservative and resource-less-efficient coding rate of the PDCCH, which may result from a given amount of PDCCH control information being transmitted with a stronger coding rate (e.g., more redundant bits for error detection and correction) at the expense of consuming more channel resources for transmitting the PDCCH information.

Three types of PDCCH channels may be used. A first type of PDCCH channel may be a UE-specific PDCCH channel, in which determined channel resources are periodically monitored by a single UE/device. With such a UE-specific PDCCH channel a UE may be configured such that the specific UE device will attempt to blindly decode the determined UE-specific candidate resources in case they may be potentially carrying DCI information for the specific UE. Such DCI information may include configuration corresponding to scheduled uplink or downlink grants, transmission configurations, or information regarding common system signaling and updates.

Blind decoding may refer to the process of a UE attempting to decode a DCI with all possible transmission configurations and aggregation levels. This typically imposes high power consumption by the UE attempting to perform the blind decoding. However, blind decoding may be necessary because the UE is not yet aware of actual configurations of the PDCCH channel and corresponding transmissions. A UE typically becomes aware of such actual configurations after the UE successfully decodes a PDCCH resource opportunity. When in an active mode (e.g., RRC_CONNECTED), a UE monitors a configured one or more PDCCH search spaces, where a search space may comprise one or more candidate resources/opportunities that may carry the PDCCH/DCI information. The search space definitions facilitate determined UE attempts to decode a PDCCH due to the varying size of the PDCCH channel (i.e., varies due to aggregation levels corresponding to varying resource sizes to carry the PDCCH).

A second type of PDCCH channel may comprise common PDCCH search spaces that may be monitored by all UEs. Common PDCCH channels typically carry DCI information/messages that are relevant to all devices. Examples include system updates and control information, all-UE power control information, and general network/system information.

A third type of PDCCH channel may comprise group-common search spaces that may be monitored by all UEs but that may be decoded only by UEs of a given group.

For a scheduled downlink or uplink data traffic transmission, a preceding PDCCH control information transmission informs one or more UEs about the scheduled resources and transmission configurations to use for transmission in the uplink (e.g., from a UE) or reception in the downlink (e.g., to a UE) directions. Accordingly, PDCCH transmissions are needed for successful device transmission and/or reception, but should be considered as signaling overhead, which preferably should be minimized.

For URLLC use cases, transmissions may comprise small and sporadic packet transmissions. For each packet transmission, a UE-specific PDCCH DCI is typically transmitted to inform the target UE of the transmission or reception configurations. Such as scheme significantly increases the number of PDCCH transmissions, and accordingly, the amount of channel resources consumed by the PDCCH channels, which reduces the overall system capacity.

Inefficient use of overall capacity to transmit data, whether in a data channel or in a control channel, may result when PDCCH configuration and associated PDCCH transmission reliability does not differentiate between types of information being carried over a PDCCH. For example, two PDCCH transmissions, carrying scheduling information for lower and higher priority traffic flows, are typically modulated using the same QPSK modulation and with the same conservative coding rate to fulfill a given PDCCH reliability level. This may result in consuming, or allocating but not utilizing, a significant amount of bandwidth that could be used to transmit data just to facilitate PDCCH transmissions that correspond to low priority traffic. For XR services, where a large amount of data traffic is typically consumed, PDCCH transmissions' overhead is a critical limitation of the system offered capacity.

Turning now to FIG. 3A, the figure graphically illustrates an example priority-specific/service-specific control channel grant instance 302 that comprises a multiple-stage, or multiple-search space, PDCCH control channel design. Grant instance 302 may be thought of as comprising search spaces within a search space. In an embodiment, a first PDCCH DCI search space 304, which may be referred to as a first downlink control channel search space, of instance 302, may comprise first scheduling information corresponding to higher-priority traffic flows and radio services (e.g., a data traffic flow destined for a center visual portion 202 of VR appliance 117 shown in FIG. 2). A traffic flow may be designated high priority based on an associated first quality of service characteristic or based on a first latency and/or reliability characteristic that corresponds to the first quality of service.

A UE 115 that is configured to receive and decode control channel instance 302 may blindly decode first PDCCH search space 304, using a determined, or predetermined, configuration, to receive or retrieve scheduling information of higher-priority XR traffic flows. The configuration of UE 115 of when to monitor or decode the first search space 304 may be received from a RAN node, or RAN component, transmitted by the RAN node in response to the RAN node receiving from the UE information regarding device type of UE 115, services that the UE, or applications running thereon, can support, or one or more Quality of service ("QoS") requirements or targets that the UE requests for a traffic flow.

First PDCCH DCI search space 304 may also comprise second PDCCH downlink control channel search space configuration information 306 that corresponds to second PDCCH DCI search space 308, which may be referred to as a second downlink control channel search space. Second PDCCH DCI search space 308 may be associated with, and used to carry scheduling information 310 corresponding to, second, lower-priority services and/or traffic flow priorities (e.g., a data traffic flow destined for a left or right visual portion 204 or 206, respectively of VR appliance 117 shown in FIG. 2). A second traffic flow may be designated lower priority based on an associated second quality of service characteristic requirement or based on a second latency characteristic requirement that corresponds to the second quality of service, the second quality of service, or the second latency, being lower, or higher, respectively, than the first quality of service or the first latency associated with a traffic flow corresponding to first search space 304.

Search space 308 being shown in FIG. 3A as smaller than search space 304 may indicate correspondence to a lower priority traffic flow. Second search space 308 being shown smaller than first search space 304 may indicate fewer, or less frequent, second search spaces than first search spaces, or may indicate that the second search spaces are shorter in time than first search spaces, or may indicate that DCI carried over the second search spaces are dynamically scheduled with higher modulation and coding schemes, tolerating less control channel reliability for lower-priority traffic and/or services.

UE 115 may decode second PDCCH search space 308 based on PDCCH configuration information 306 retrieved from, or resulting from, the decoding of first PDCCH DCI search space 304. Second PDCCH search space 308 may comprise scheduling information 310 for, or corresponding to, a lower-priority data traffic flow. The UE may use scheduling information 310 corresponding to the lower-priority traffic flow to decode the lower-priority data traffic flow. Accordingly, the traffic-type/service-priority-aware PDCCH control channel design facilitates higher reliability for control channels associated with higher priority services and a relaxed reliability for control channels tied with lower-priority traffic, thus increasing capacity and efficient use of PDCCH control channel resources. In other words, control channel resources for scheduling of lower priority traffic flows may themselves be allocated a lower priority in the PDCCH control channel, thus using less overall wireless resources that can in turn be used for the higher priority control channel or for other wireless transmissions.

Turning now to FIG. 3B, the figure graphically illustrates an example priority-specific/service-specific control channel grant instance 312 that comprises a multiple-stage, or multiple-search space, PDCCH control channel design that facilitates inter-UE multiplexing information. A first PDCCH DCI search space 314, which may be referred to as a first downlink control channel search space, of instance 312, may comprise first scheduling information corresponding to higher-priority traffic flows and radio services (e.g., a data traffic flow destined for a center visual portion 202 of VR appliance 117 shown in FIG. 2).

One or more UEs 115A-115*n* that that may be configured to receive and decode control channel instance 312 may blindly decode first PDCCH search space 314, using a determined, or predetermined, configuration, to receive or retrieve scheduling information of higher-priority XR traffic flows. The configuration of UEs 1151-115n of when to monitor or decode the first search space 314 may be received from a RAN node, or RAN component, transmitted by the RAN node in response to the RAN node receiving from the UEs information regarding device type of the UEs, services that the UEs, or applications running thereon, can support, or one or more Quality of service ("QoS") requirements or targets that the UEs request for one or more service or traffic flows.

First PDCCH DCI search space 314 may also comprise second PDCCH downlink control channel search space configuration information 316A-316n that corresponds to second PDCCH DCI search space 318, which may be referred to as a second downlink control channel search space. Second PDCCH downlink control channel search space configuration information 316A-316n may comprise separate, and different, information corresponding to UEs 115A-115n, but is shown in the figure as a single information transmission to and from UE 115n for clarity in the figure. Second PDCCH DCI search space 318 may be associated with, and may be used to carry, scheduling information 320A-320n corresponding to, lower-priority services and/or traffic flow priorities (e.g., a data traffic flow destined for a left or right visual portion 204 or 206, respectively of VR appliance 117 shown in FIG. 2). Search space 318 being shown in FIG. 3B as smaller than search space 314 may indicate correspondence to a lower priority traffic flow, or flows.

UEs 115A-115n may decode second PDCCH search space 318 based on PDCCH configuration information 316A-316n retrieved from, or resulting from, the decoding of first PDCCH DCI search space 314. Second PDCCH search space 318 may comprise scheduling information 320A-320n for, or corresponding to, a lower-priority data traffic flow. UEs 115A-115n may use scheduling information 320A-320n corresponding to the lower-priority traffic flow(s) to decode the lower-priority data traffic flow(s).

In FIG. 3A or 3B, first UE-specific DCI search space 304, or 314, may be designed for high-priority services and/or traffic flows. The transmission configurations of the first higher-priority DCI search space 304, or 314, may be predetermined using higher layer signaling (e.g., RRC signaling) at the time of RRC connection establishment with the RAN. An active UE 115, which may be receiving, or set to receive, a radio service (e.g., XR/VR/MR/AR), may monitor and blindly decode corresponding configured service/flow priority-specific first DCI search space 304. First higher-priority DCI search space 304, or 314, may include one or more information elements. Search space 304, or 314, may comprise uplink and/or downlink grant information of the higher-priority service and/or traffic flows, such as information of the granted channel resources, traffic flow IDs and/or service IDs, and associated transmission configurations such as modulation and coding scheme ("MCS") level, and hybrid Automatic Repeat Request ("HARQ") process identifiers. Search space 304, or 314, may include scheduling and transmission information 306, or 316, respectively, of second lower-priority PDCCH DCI search space 308, 318, respectively, such as search space channel resources (time periodicity and frequency, or frequency range, resources), a corresponding PDCCH aggregation level, modulation and coding scheme (MCS), or inter-UE multiplexing information. (The latter information element may primarily relate to the case where multiple active UEs 115A-115n, for example, as shown in FIG. 3B, are config-ured to monitor and decode the second lower priority DCI 318 and may include information on spatial codes/vectors to be used by each active UE in order to decode its own DCI information within the lower-priority search space 318.)

Accordingly, based on blind decoding of the first DCI search space (304 or 314), the UE/UEs may determine(s) scheduling and transmission information (306, 316) and/or configurations of the second lower-priority DCI search space, active UE/UEs 115/115A-115n decode(s) the second DCI 308, or 318, respectively, and determine(s) scheduling information 310, or 320A-n, respectively, of the lower-priority services and/or traffic flows. A control channel with first and second search spaces corresponding to first and second service/flow priorities facilitates a wireless communication network transmitting control channel information with high-reliability for higher-priority critical services and/or traffic flow IDs, while relaxing the PDCCH reliability for lower-priority traffic flows. Thus, overall PDCCH channel overhead is minimized, leaving more channel resources for the higher-capacity-requirement services, for example XR applications.

Figure 4:
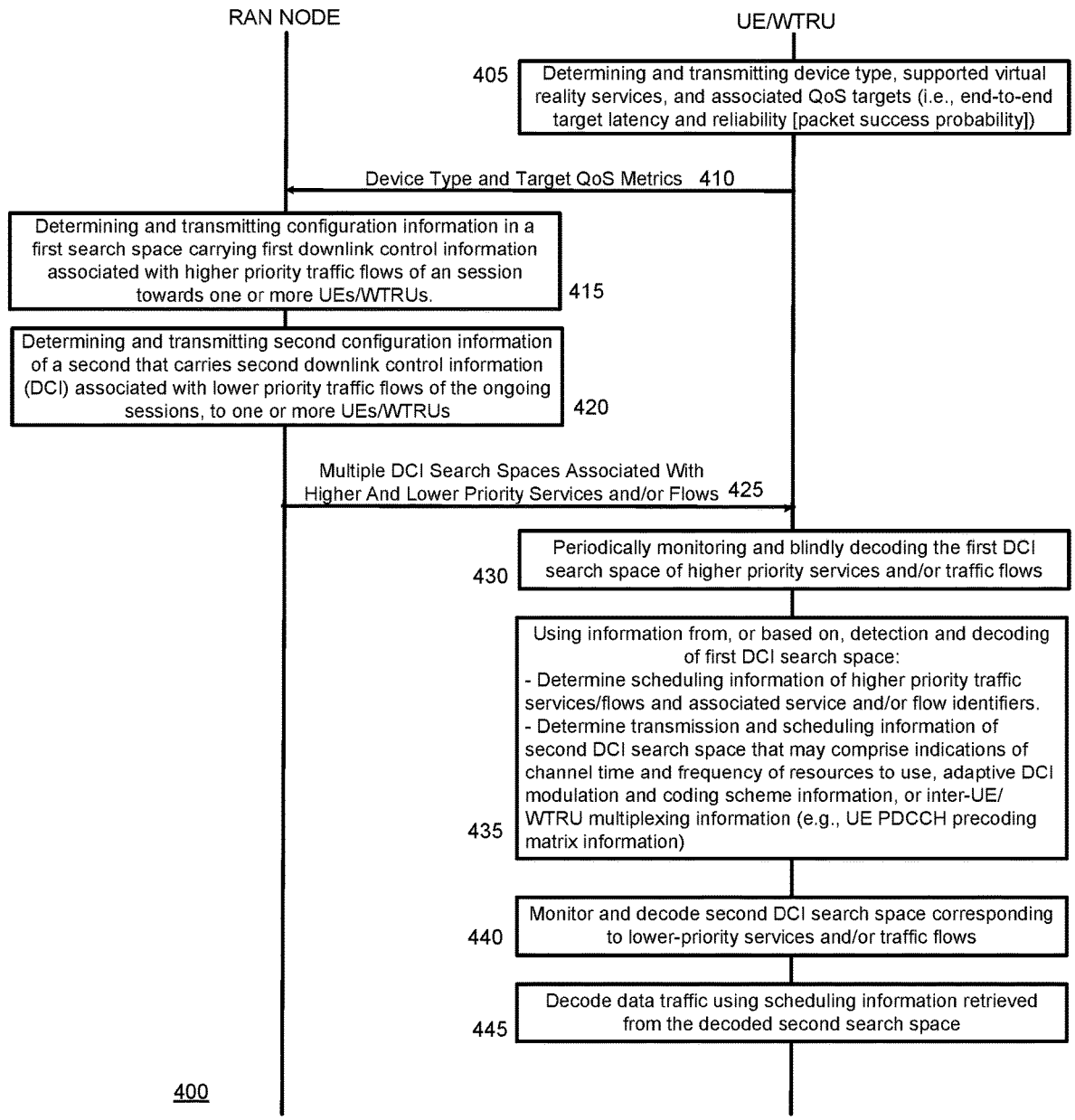
FIG. 4 illustrates an embodiment system timing diagram of a method to configure UEs to monitor and decode a first and second downlink control channel search spaces.

Turning now to FIG. 4, the figure illustrates a timing diagram 400 showing steps to configure UEs to monitor and decode a first downlink control channel search space; retrieve second downlink control channel search space information from the blindly decoded first downlink control channel search space; decode the second downlink control channel search space according to the second downlink control channel search space information, resulting in a decoded second control channel search space; retrieve scheduling information for a data traffic flow, such as a low-priority traffic flow, from the decoded second control channel search space; and decoding the data traffic flow according to the scheduling information.

At step 405 a UE, which may be referred to as a wireless transmit/receive unit ("WTRU"), determines a type of service or QoS that it needs. For example, if the UE is a virtual reality appliance, a VR application running on a VR appliance, or a VR application running on a smartphone tethered to a VR appliance, that needs a high priority service flow to facilitate a satisfactory user experience, the UE may determine that it needs a first priority for a flow that supplies data for a center visual portion of the VR appliance and a second priority, which may be lower than the first priority, for a flow, or flows, that supply/supplies data for a right or left visual portion of the VR device. In an embodiment, a user may use his, or her, smart phone UE for purposes of interacting with a wireless RAN and to transfer data flows to another device, such as a VR appliance, via a short-range wireless tethering link, such as a Bluetooth link. The UE transmits at step 410 its device type, a list of new information elements indicating supported services, or user-requested service, such as, for example, virtual reality, augmented reality, or mixed reality services, and associated QoS needs/requirements/targets, for example end-to-end target latency and reliability (e.g., packet success probability), to a RAN node, or other network component, or a wireless communication network to which it is connected.

At step 415 the RAN node determines and transmits configuration information in a first search space carrying first downlink control information associated with higher priority traffic flows of a session, new or ongoing, towards one or more UEs/WTRUs. At step 420 the RAN node determines and transmits second configuration information of a second search space that carries second downlink control information (DCI) associated with lower priority traffic flows of new or ongoing session, to one or more UEs/WTRUs. It will be appreciated that the activities performed by the RAN at step 420 may be performed substantially simultaneously as the activities step 415 insofar as the second configuration information pertaining to the second search space may be transmitted in the first search space.

At step 425 the RAN node transmits, or makes available to, one or more UEs multiple DCI search spaces, such as first and second DCI search spaces, associated with higher and lower priority services and/or flows.

At step 430 a UE periodically monitors and, as a result of the monitoring, receives and blindly decodes a first DCI search space multi-stage and service/priority-aware DCI configurations, wherein the first search space corresponds to higher priority services and/or traffic flows. Scheduling information retrieved from the decoded first search space may comprise information pertaining to a higher priority data service flow, for example, where or how to obtain the data traffic flow with respect to time and frequency domains, time periodicity, and associated service or flow identifiers.

At step 435 the UE uses information from, or based on, detection and decoding of first DCI search space, to determine scheduling information of higher priority traffic services/flows and associated service and/or flow identifiers, and to determine transmission and scheduling information of second DCI search space that may comprise indications of channel time and frequency of resources to use, adaptive DCI modulation and coding scheme information, or inter-UE/WTRU multiplexing information (e.g, UE PDCCH precoding matrix information), periodicity, associated lower-priority services and/or traffic flow identifiers, DCI modulation and coding scheme, second DCI aggregation level, or UE-specific DCI precoding vector/matrix.

At step 440 the UE monitors and decodes the second DCI search space corresponding to lower-priority services and/or traffic flows to determine scheduling information related thereto and at step 445 the UE decodes data traffic of the lower priority traffic flow, or service, using scheduling information retrieved from the decoded second search space. It will be appreciated that in an aspect a second search space may not comprise scheduling information pertaining to a given UE for a low priority service/flow, so a UE may not have a lower-priority data traffic flow to decode at step 445.

Figure 5:
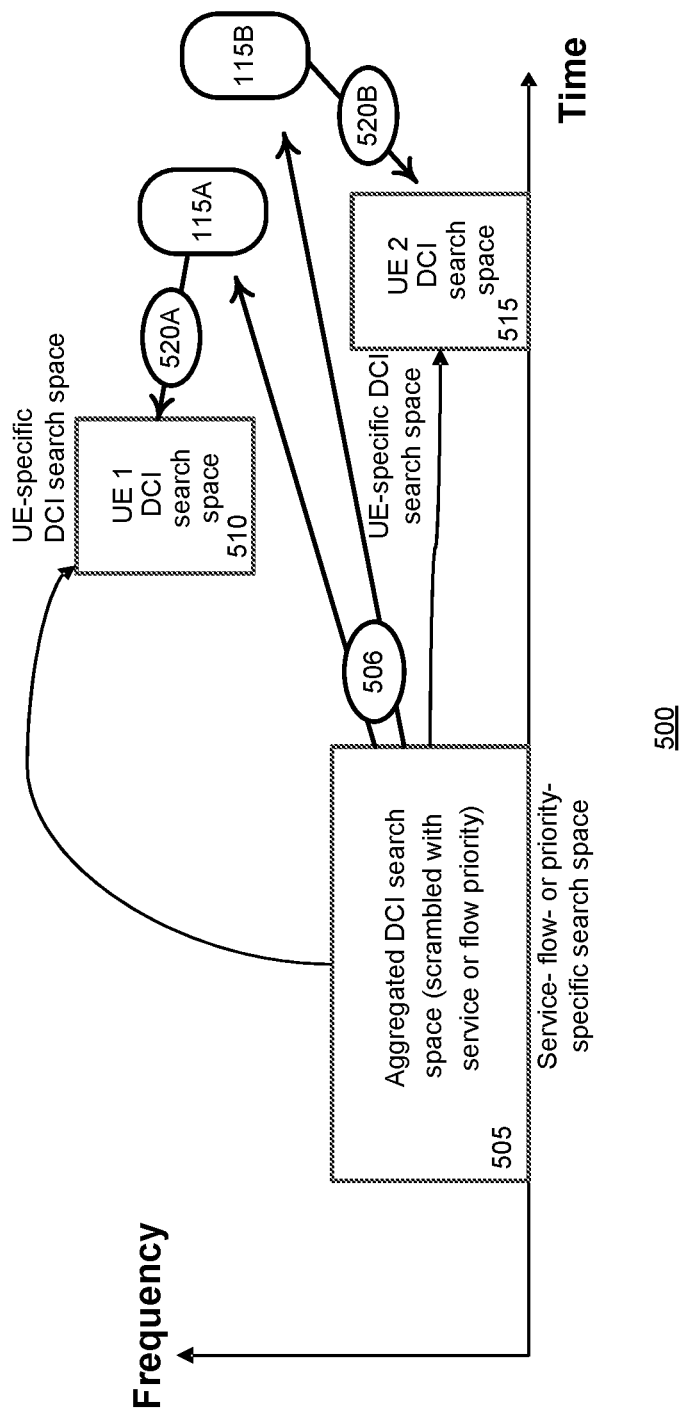
FIG. 5 illustrates example search space grants associated with an aggregated and service/priority-specific downlink control channel search space.

Turning now to FIG. 5, the figure illustrates an example diagram of search space grants for an aggregated and service/priority-specific downlink control channel 500. A first search space 505 may be decoded with a service-type-specific scrambling code by UEs within wireless communication range of a given RAN node, but second downlink control channel search spaces 510 or 515 may be encoded, or scrambled, using device-specific-scrambling codes such that only UEs to which the device-specific-scrambling codes correspond can decode the respective second downlink control channel search space 510 or 515.

Active UEs 115A and 115B transmit, to a RAN network node, their respective supported list of XR services. Examples include AR, MR, VR, and common XR. The network/RAN node configures UEs 115A and 115B to monitor DCI search space 505 that is UE-group-common to all UEs monitoring incoming traffic of similar services and/or traffic flows. (UEs 115A and 115B are shown for purposes of illustration—more UEs may be the same group as UEs 115A and 115B.) For instance, the RAN node may configure more than a single active UE to monitor DCI search space 505, associated with incoming downlink or uplink scheduling grants for the XR services or traffic flows. Service/priority-specific search spaces 510 and 515 may be scrambled/coded by the scrambling code or codes associated with the services or traffic flows of interest. Aggregated DCI transmission 505 may be scrambled with a code corresponding to a service and/or traffic flow priority to be monitored, and UE-specific DCI search spaces 510 and 515 may each be associated with a single active UE 115a or 115B, respectively, and may be scrambled with a UE-specific connected mode radio network temporary identifier ("C-RNTI").

Aggregated DCI search space 505 may comprise information 506 that may include a UE identifier list and corresponding UE-specific DCI search space information 520A and 520B that may be used for decoding and accessing grants of search spaces 510 or 515, respectively, that may be associated with the service(s) and/or traffic flows of interest to the respective UEs. A UE-specific search space 510 or 515 may comprise the following information objects: identification of channel resources, search space aggregation level, indication of scrambling code(s) to be used for decoding data traffic flows, or DCI scheduling information, including MCS index, for a scenario where a search space is dynamically scheduled for an optimized spectral efficiency. Information 506 retrieved from search space 505 may comprise a service identifier and/or a traffic flow identifier, and/or a subservice identifier, which information may facilitate UEs 115A or 115B in monitoring the aggregated DCI search space 505 for receiving DCIs related to XR services. In an aspect, each UE may have multiple XR subservices or various traffic XR flows under the same XR service.

Accordingly, UEs 115A and 115B may be configured to monitor aggregated DCI search space 505 for the indicated one or more service(s) and/or traffic flows of interest. UEs 115A or 115B may monitor and blindly decode aggregated DCI search space 505 using a signaled service and/or traffic flow-specific scrambling code received from the RAN node. In an aspect, upon detecting a correct cyclic redundancy check ("CRC"), the UEs monitor search space 505 for their respective UE identifiers (e.g., C-RNTIs) and corresponding UE-specific search space information. If a UE 115A or 15B determines the presence of its identifier in search space 505 the UE decodes its corresponding UE-specific DCI search space 510 or 515, respectively, using information respective information 520A or 520B and determines scheduling grant information for data traffic flows for the indicated service identifiers, traffic flow identifiers, or subservices identifiers.

Aggregated DCI search space 505 may be implemented to facilitate different traffic flow scenarios. In an example embodiment, aggregated DCI search space 505 may be associated with a service and/or traffic flow priority or identifier, which may be common to a group of active UEs such as UEs 115A and 115B. However, search space 505 may be scrambled with a UE-specific identifier, for example a C-RNTI. Thus, UEs 115A and 115B may monitor aggregated search space 505 for scheduling information of services associated with the group but only a single active UE may be able to decode the aggregated DCI search space. Implementing this embodiment may result in a reduction of resource overhead (e.g., bandwidth) needed for PDCCH channel transmission transmitted towards certain high QoS XR services at the expense of extended control channel latency, which may impact the end user experience. The increased control channel latency is because only one active UE decodes the aggregated control channel search space at a time while other active UEs, which may a have packet arrivals pending, must wait until a next opportunity of aggregated DCI search space 505.

In an embodiment, aggregated DCI search space 505 may be scrambled according to a priority level. Active UEs, configured to monitor the aggregated DCI search space 505, blindly decode the aggregated DCI search space priority scrambling codes, and retrieve from the aggregated search space information to determine their own and UE-specific DCI search spaces alongside DCI scheduling information and associated subservice identifiers corresponding to search spaces 510 or 515.

Because aggregated DCI search space 505 may be carried in a PDCCH control channel that is beamformed according to channel vectors/parameters intended to maximize wireless channel signal power received at a given UE, and the aggregated DCI search space may be transmitted for decoding by multiple UEs in a UE-group-common group, the aggregated DCI search space opportunity may perform redundant transmission repetitions on different downlink beams, each beam being associated with a different active UE that may be configured to monitor the aggregated DCI search space. Therefore, the network/RAN node may transmit to the active UEs a new information object indicating a set of occasion opportunities of the aggregated DCI search space 505, where each transmission occasion of the set is associated with and transmitted on a different active beam corresponding to a different active UE.

In an embodiment, a WTRU/UE transmits to a RAN node device type information including power capability indication, supported service list and IDs, and target QoS latency and capacity metrics associated with the UE. In response, the WTRU/UE receives an aggregated DCI search space configurations including search space channel resources, service and/or flow priority and/or UE-specific ID to use as a de-scrambling code, aggregated DCI format indication (e.g., UE-specific or service/flow priority specific), and DCI-beam association map (e.g., aggregation DCI repetition pattern on active beams). A WTRU/UE may monitor and blindly decode an aggregated DCI search space using a configured scrambling code received from the RAN node component. Using information retrieved from the aggregated DCI search space a UE may determine scheduling and transmission information of WTRU/UE-specific DCI search space including DCI channel resources, periodicity, WTRU/UE-specific scrambling code, MCS, aggregation level, and one or more service and/or subservices and/or traffic flow identifiers. A WTRU/UE may monitor and decode the WTRU/UE-specific DCI search space and determine service and/or traffic flow scheduling grant information therefrom.

Figure 6:
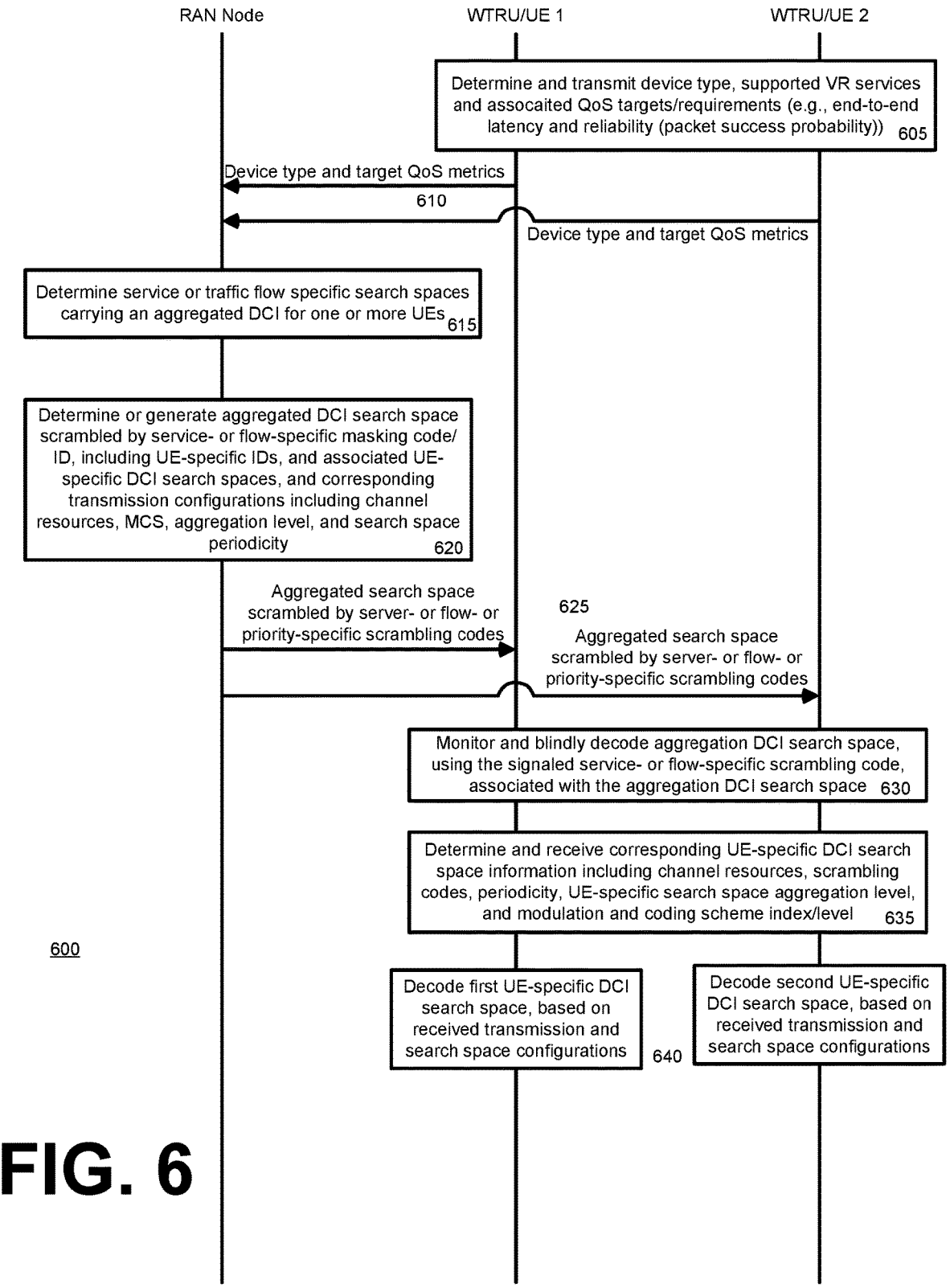
FIG. 6 illustrates a flow diagram of an example method to configure UEs to use an aggregated and service/priority-specific downlink control channel search space and search space grants associated therewith.

Turning now to FIG. 6, the figure illustrates timing diagram of method 600 showing steps to configure UEs to monitor and decode a first downlink control channel search space; retrieve second downlink control channel search space information from the blindly decoded first downlink control channel search space; decode the second downlink control channel search space according to the second downlink control channel search space information, resulting in a decoded second control channel search space, which may comprise different second control channel spaces corresponding to different UEs; retrieve scheduling information for one or more data traffic flows, such as low-priority traffic flows, from the decoded second control channel search spaces; and decoding the one or more data traffic flows according to the scheduling information.

At step 605 a WTRU/UE determines a type of service or QoS that it needs. For example, if the UE is a virtual reality appliance, a VR application running on a VR appliance, or a VR application running on a smartphone tethered to a VR appliance, that needs a high priority service flow to facilitate a satisfactory user experience, the UE may determine that it needs a first priority for a flow that supplies data for a center visual portion of the VR appliance and a second priority, which may be lower than the first priority, for a flow, or flows, that supply/supplies data for a right or left visual portion of the VR device. In an embodiment, a user may use his, or her, smart phone UE for purposes of interacting with a wireless RAN and to transfer data flows to another device, such as a VR appliance, via a short-range wireless tethering link, such as a Bluetooth link. The UE transmits at step 610 its device type, a list of new information elements indicating supported services, or user-requested service, such as, for example, virtual reality, augmented reality, or mixed reality services, and associated QoS needs/requirements/targets, for example end-to-end target latency and reliability (e.g., packet success probability), to a RAN node, or other network component, or a wireless communication network to which it is connected.

At step 615 a RAN node determines service-specific or traffic-flow-specific search spaces carrying an aggregated DCI for one or more UEs. At step 620 the RAN node determines or generates an aggregated DCI search space scrambled by a service-specific or flow-specific masking code/ID. The aggregated search space may comprise UE-specific identifiers and information that indicates associated UE-specific DCI search spaces and corresponding transmission configurations including channel resources, MCS, aggregation level, and search space periodicity. At step 625 the RAN node transmits an aggregated search space scrambled by server-specific, or flow-specific, or priority-specific scrambling codes. At step 630 EUs monitor for, detect, and blindly decode the aggregation DCI search space transmitted from the RAN node at step 625 using the signaled service-specific or flow-specific or priority-specific scrambling code associated with the aggregation DCI search space. At step 635 the UEs individually determine and receive corresponding UE-specific DCI search space information including channel resources, scrambling codes, periodicity, UE-specific search space aggregation level, and modulation and coding scheme index/level. At step 640 UEs individually decode their respective UE-specific DCI search spaces based on information received and retrieved from search space configurations identified in the aggregated DCI search space transmitted at step 625.

Figure 7:
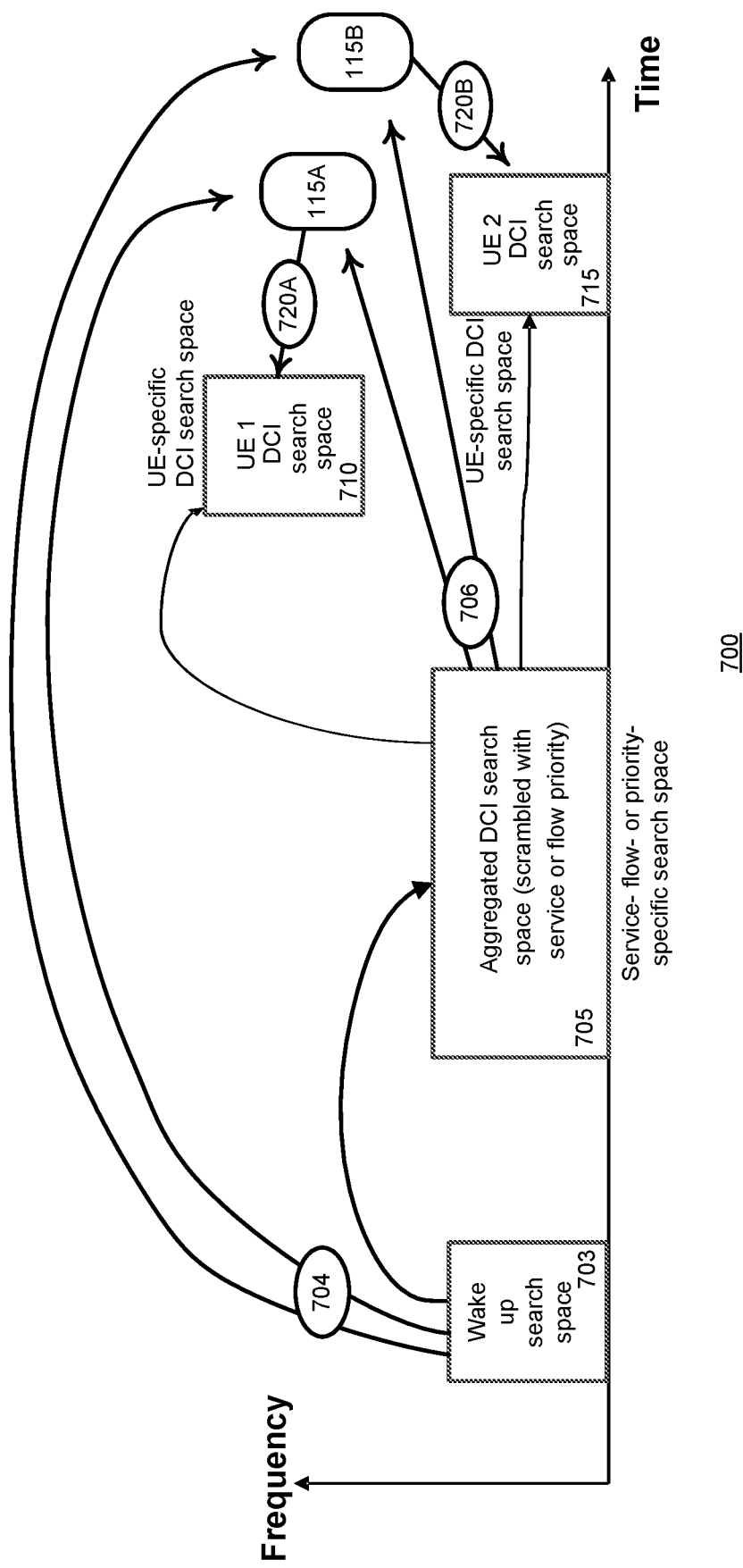
FIG. 7 illustrates an example wake up search space used with an aggregated and service/priority-specific downlink control channel search space and search space grants associated therewith.

Turning now to FIG. 7, the figure illustrates an example embodiment 700 of using wake-up information contained in a wake-up search space to change an inactive UE to an active mode so that the UE can monitor another search space. UEs 115A and 115B monitor wake-up indication control channel search space 703 according to a configuration to do so received from a RAN node component. UEs 115 or 115B may retrieve wake up information 704 from the wake-up indication control channel search space 703 and blindly decode the wake-up information 704 using a service-type-specific scrambling code, resulting in blindly decoded wake up information. UE 115A or 115B may analyze the blindly decoded wake up information to result in analyzed decoded wake up information, which may indicate that one, or both, of the UEs are instructed to wake-up (e.g., change the UE from an idle mode to an active mode) based on a determination that the analyzed decoded wake up information comprises an instruction for the user equipment to wake up.

A wake-up signal ("WUS") may comprise a limited DCI search space, the transmission of which may precede a PDCCH DCI control channel search space. Upon a UE 115A or 115B detecting a WUS from wake-up search space 703, the UE determines that there is a potentiality incoming PDCCH transmission, and thus, it needs to fully wake up, monitor, and blindly decode its configured DCI PDCCH search space. If a UE 115A or 115B does not detect a WUS signal directed to the UE in search space 703, the UE determines that there is not a forthcoming PDCCH DCI transmission and continues deep sleeping, thus avoiding a full transceiver wake-up a concomitant power use and blind decoding attempts of a non-existent DCI PDCCH search space (e.g., no forthcoming DCI PDCCH search space intended for the particular UE.

In an embodiment, a service-priority-specific and/or a traffic flow-priority-specific WUS signal may be associated with a predefined set of services and/or traffic flow identifiers. The WUS DCI signal may be scrambled with a scrambling code corresponding to one or more services and/or traffic flow priorities. In an aspect using a sequence-based WUS, the WUS sequence may be associated with a certain service or traffic flow priority. Such association may be signaled to active UEs, such as 115A or 115B shown in FIG. 7, during RRC connection establishment, as part of higher layer RRC signaling, or as part of lower layer DCI signaling.

Thus, as shown by FIG. 7, UEs 115A or 115B, which may be active, monitor and blindly decode the limited search space of the service-specific and/or flow-specific WUS signal 703. On condition of correctly detecting the WUS (e.g., determining from information 704 that there is an indication directed to one of UEs 115A or 115B) using the scrambling code of the service and/or traffic flow of interest, one or more of the UEs may determine that there is an incoming PDCCH DCI which they need to monitor and blindly decode. Thus, the transmitted aggregated DCI search space 705 is associated with a group of services or traffic flow priorities, the specific DCI of a certain service or flow priority being determined based on the decoding of the WUS transmission using a scrambling code comprising a service-specific, a flow-specific, or a priority-specific scrambling code.

Using a WUS search space, such as search space 703 shown in FIG. 7, provides advantages, such as, for example, a power saving gain at the UE due to more, or extended, deep sleep periods (e.g., a UE is inactive during a sleep portion of a discontinuous reception cycle ("DRX") configured for the UE. In addition, an active UE can avoid power-inefficient blind decoding of the aggregated DCI search space 705 in case no services or flow priorities of interest to the UE are forthcoming to the UE. Another benefit of using a WUS search space is reduction of the required PDCCH control channel overhead due to the aggregation of the DCI information, hence, the bandwidth that would have been otherwise used, even if there is no scheduling information directed to a given UE, can be used instead for control channel multi-user MIMO and inter-UE multiplexing techniques.

Figure 8:
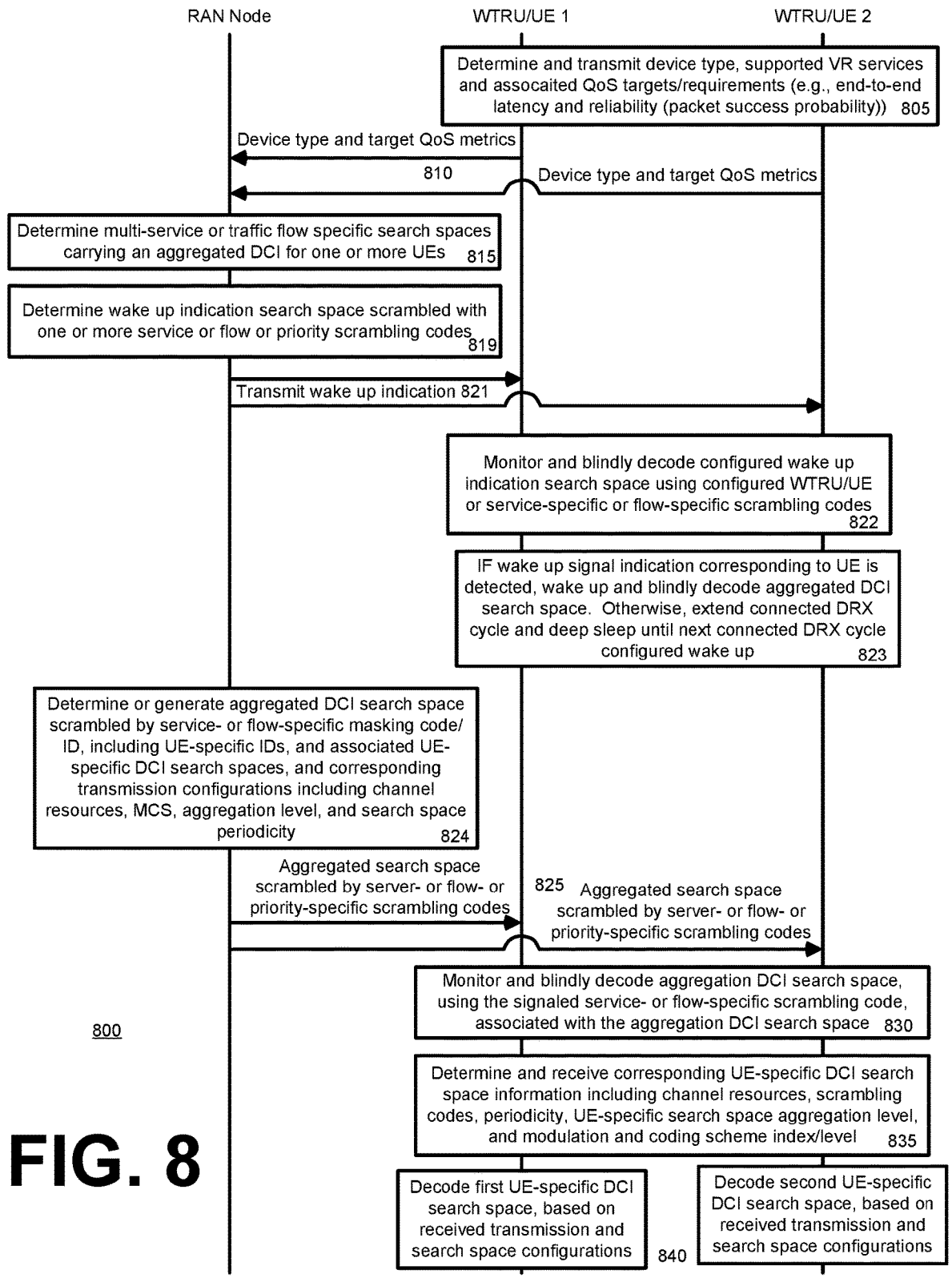
FIG. 8 illustrates a flow diagram of an example method to configure UEs to use a wake-up search space and an aggregated and service/priority-specific downlink control channel search space and search space grants associated therewith.

Turning now to FIG. 8, the figure illustrates a timing diagram of an example embodiment method 800 of using wake-up information contained in a wake-up search space to change an inactive UE to an active mode before the UE monitors and attempts to decode another search space with the UE configured to monitor and decode a first downlink control channel search space; retrieve second downlink control channel search space information from the blindly decoded first downlink control channel search space; decode the second downlink control channel search space according to the second downlink control channel search space information, resulting in a decoded second control channel search space, which may comprise different second control channel spaces corresponding to different UEs; retrieve scheduling information for one or more data traffic flows, such as low-priority traffic flows, from the decoded second control channel search spaces; and decoding the one or more data traffic flows according to the scheduling information.

At step 805 a WTRU/UE determines a type of service or QoS that it needs. For example, if the UE is a virtual reality appliance, a VR application running on a VR appliance, or a VR application running on a smartphone tethered to a VR appliance, that needs a high priority service flow to facilitate a satisfactory user experience, the UE may determine that it needs a first priority for a flow that supplies data for a center visual portion of the VR appliance and a second priority, which may be lower than the first priority, for a flow, or flows, that supply/supplies data for a right or left visual portion of the VR device. In an embodiment, a user may use his, or her, smart phone UE for purposes of interacting with a wireless RAN and to transfer data flows to another device, such as a VR appliance, via a short-range wireless tethering link, such as a Bluetooth link. The UE transmits at step 810 its device type, a list of new information elements indicating supported services, or user-requested service, such as, for example, virtual reality, augmented reality, or mixed reality services, and associated QoS needs/requirements/targets, for example end-to-end target latency and reliability (e.g., packet success probability), to a RAN node, or other network component, or a wireless communication network to which it is connected.

At step 815 a RAN node determines service-specific or traffic-flow-specific search spaces carrying an aggregated DCI for one or more UEs. At step 819 the RAN node determine wake up indication search space information and scrambles it with one or more service or flow or priority scrambling codes and transmits the scrambled wake-up search space to one or more UEs at step 821. At step 822 the UEs monitor and blindly decode at a configured time the wake up search space using configured WTRU/UE or service-specific or flow-specific scrambling codes. At step 823 one or more UEs determine whether an indication retrieved from the decoded wake-up search space indicates is directed to one of the UEs. If a wake up signal indication corresponding to a UE is detected, a UE to which the wake up signal indication is directed wakes up to blindly decode an aggregated DCI search space. If a wake up signal indication corresponding to a UE is not detected in information retrieved from the wake up signal search space, the UE extends a connected DRX cycle and stays in a sleep mode until a next connected DRX cycle configured wake up.

At step 824 the RAN node determines or generates an aggregated DCI search space scrambled by a service-specific or flow-specific masking code/ID. The aggregated search space may comprise UE-specific identifiers and information that indicates associated UE-specific DCI search spaces and corresponding transmission configurations including channel resources, MCS, aggregation level, and search space periodicity. After a UE changes from an inactive mode to an active mode (e.g., changes from a sleep mode to an awake mode) as a result of a wake up indication retrieved from decoding a wake up search space, the UE may monitor an aggregated DCI search space transmitted from a RAN node at step 825. The aggregated search space may be scrambled by server-specific, or flow-specific, or priority-specific scrambling codes. At step 830 UEs monitor for, detect, and blindly decode the aggregation DCI search space transmitted from the RAN node at step 825 using the signaled service-specific or flow-specific or priority-specific scrambling code associated with the aggregation DCI search space. At step 835 the UEs individually determine and receive corresponding UE-specific DCI search space information including channel resources, scrambling codes, periodicity, UE-specific search space aggregation level, and modulation and coding scheme index/level. At step 840 UEs individually decode their respective UE-specific DCI search spaces based on information received and retrieved from search space configurations identified in the aggregated DCI search space transmitted at step 825. It will be appreciated that some of the steps may be performed in different order.

A WTRU/UE may transmit to a RAN node device type information of the UE, including power capability indication, supported service list and IDs, and target QoS latency and capacity metrics. The WTRU/UE may receive wake-up signal configuration information, including a format of the WUS (e.g., sequence or DCI based), search space information in terms of channel resources, periodicity, and associated service-specific and/or traffic flow priority scrambling codes. A WTRU/UE receives an aggregated DCI search space configuration, which may include search space channel resources, service and/or flow priority and/or UE-specific ID to use as a de-scrambling code, and aggregated DCI format indication (e.g., UE-specific or service/flow priority specific). The WTRU/UE may monitor, detect and/or blindly decode a wake-up signal DCI and/or sequence using the scrambling codes of the services and/or traffic flows of interest. If a correct wake up signal is detected with a correct CRC based on configured service-specific scrambling codes, the WTRU/UE may monitor and blindly decode aggregated DCI search space using configured scrambling codes A RAN node may determining scheduling and transmission information of a WTRU/UE-specific DCI search space including DCI channel resources, periodicity, UE-specific scrambling code, MCS, aggregation level, and one or more service and/or subservices and/or traffic flow IDs. UEs may monitor and decode a WTRU/UE-specific DCI search space and determine service and/or traffic flow scheduling grant information corresponding to a data traffic flow for the WTRU/UE therefrom.

Figure 9:
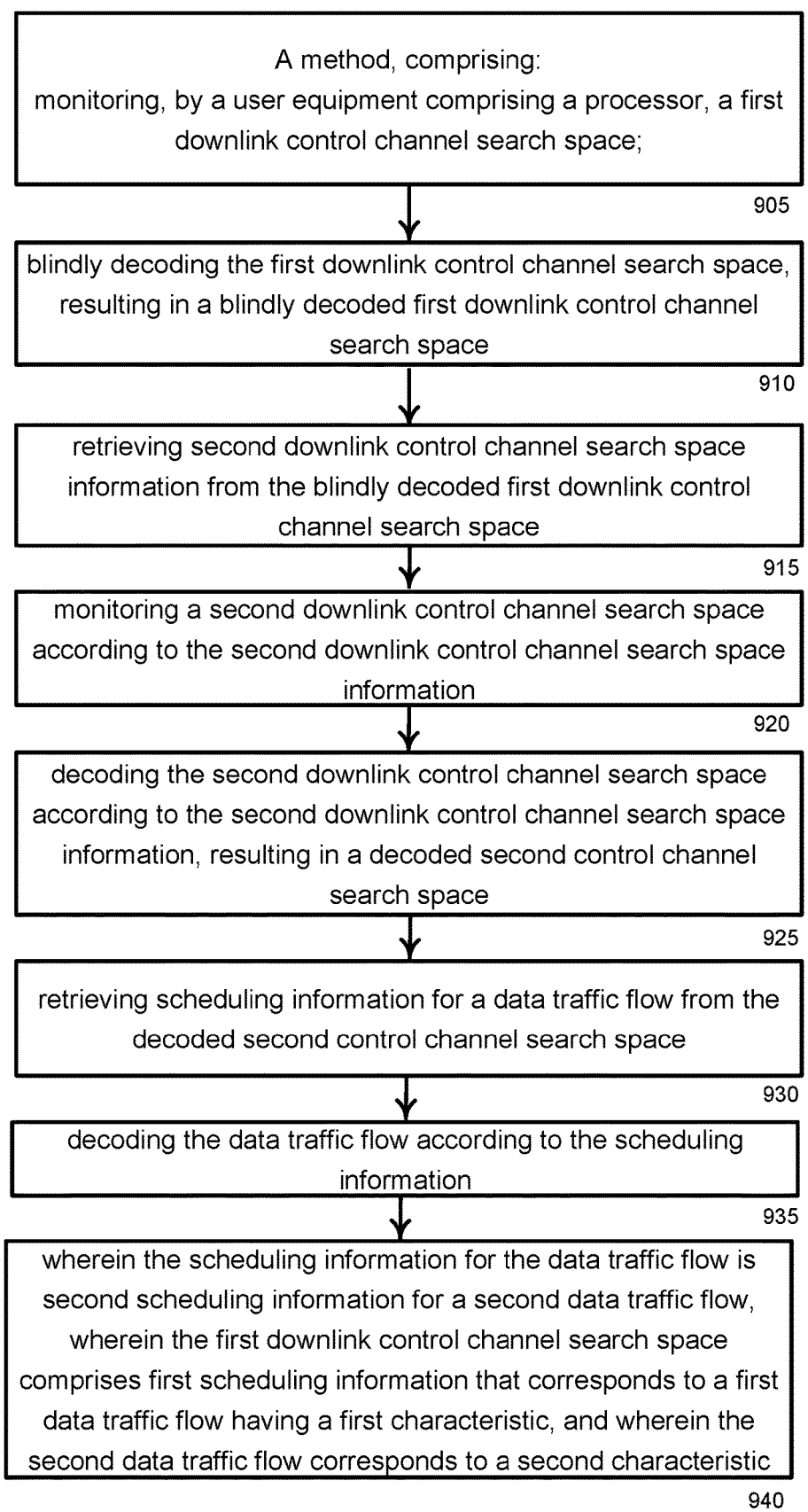
FIG. 9 illustrates a block diagram of an example method.

Turning now to FIG. 9, the figure illustrates an example embodiment method 900 at block 905 monitoring, by a user equipment comprising a processor, a first downlink control channel search space; at bock 910 blindly decoding the first downlink control channel search space, resulting in a blindly decoded first downlink control channel search space, at block 915 retrieving second downlink control channel search space information from the blindly decoded first downlink control channel search space; at block 920 monitoring a second downlink control channel search space according to the second downlink control channel search space information; at block 925 decoding the second downlink control channel search space according to the second downlink control channel search space information, resulting in a decoded second control channel search space; at block 930 retrieving scheduling information for a data traffic flow from the decoded second control channel search space; at block 935 decoding the data traffic flow according to the scheduling information; wherein at block 940 wherein the scheduling information for the data traffic flow is second scheduling information for a second data traffic flow, wherein the first downlink control channel search space comprises first scheduling information that corresponds to a first data traffic flow having a first characteristic, and wherein the second data traffic flow corresponds to a second characteristic.

Figure 10:
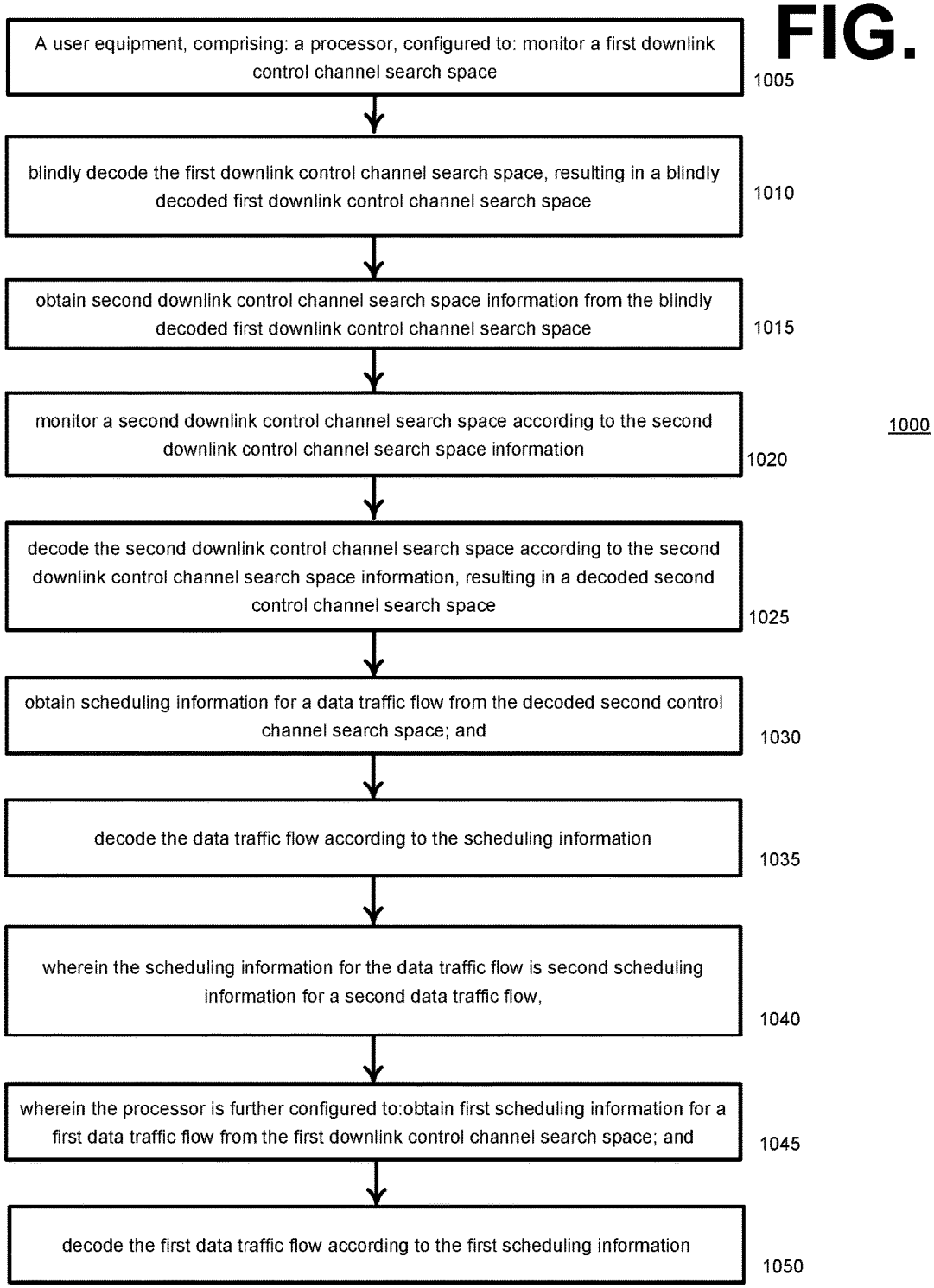
FIG. 10 illustrates a block diagram of an example user equipment.

Turning now to FIG. 10, the figure illustrates an example user equipment 1000 having a processor configured to at block 1005 monitor a first downlink control channel search space; at block 1010 blindly decode the first downlink control channel search space, resulting in a blindly decoded first downlink control channel search space; at block 1015 obtain second downlink control channel search space information from the blindly decoded first downlink control channel search space; at block 1020 monitor a second downlink control channel search space according to the second downlink control channel search space information; at block 1025 decode the second downlink control channel search space according to the second downlink control channel search space information, resulting in a decoded second control channel search space; at block 1030 obtain scheduling information for a data traffic flow from the decoded second control channel search space; and At block 1035 decode the data traffic flow according to the scheduling information; wherein at block 1040 wherein the scheduling information for the data traffic flow is second scheduling information for a second data traffic flow, and wherein the processor is further configured to at block 1045 obtain first scheduling information for a first data traffic flow from the first downlink control channel search space; and at block decode the first data traffic flow according to the first scheduling information.

Figure 11:
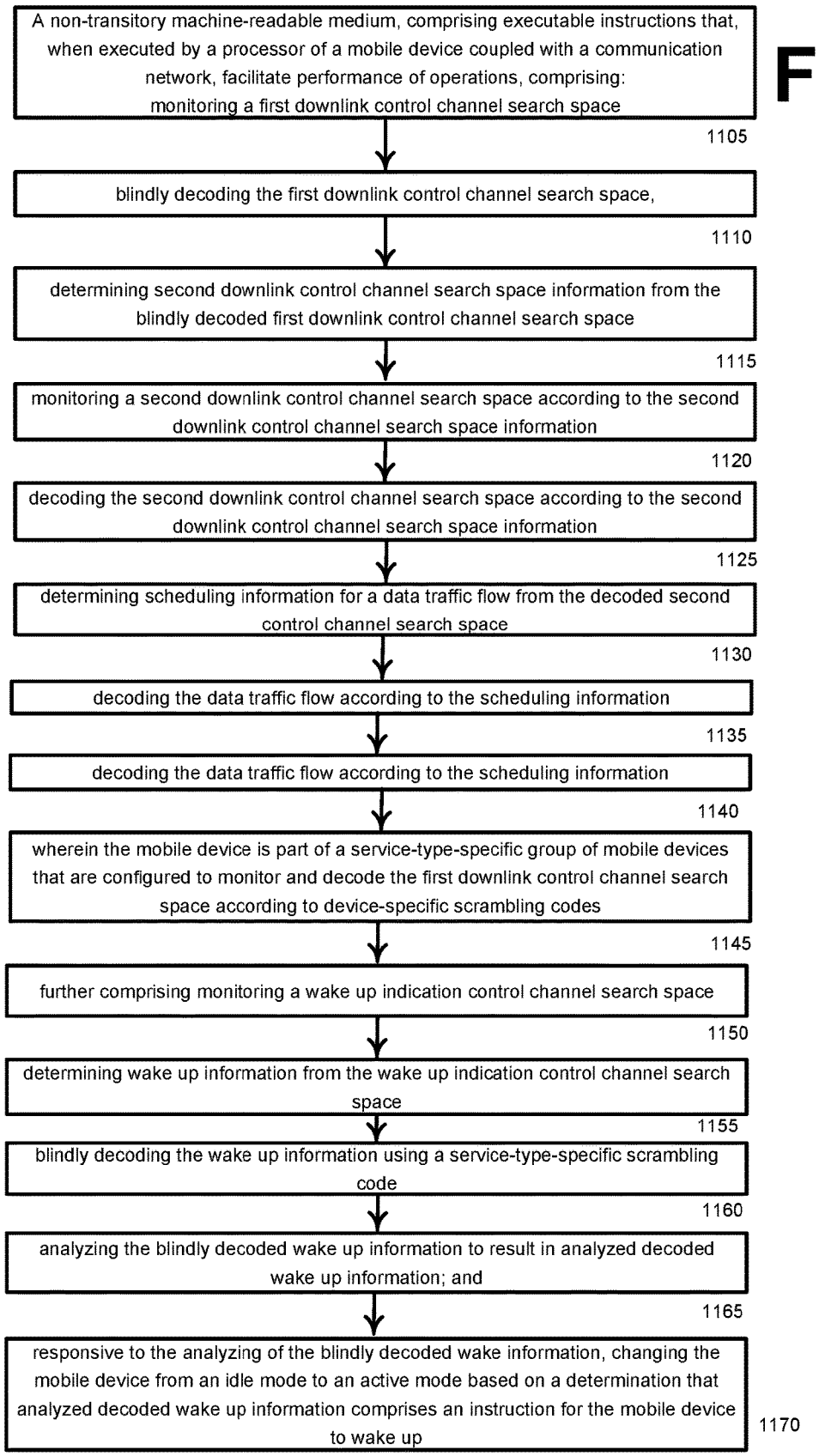
FIG. 11 illustrates a block diagram of an example non-transitory machine-readable medium.

Turning now to FIG. 11, the figure illustrates a non-transitory machine-readable medium 1100 at block 1105 comprising executable instructions that, when executed by a processor of a mobile device coupled with a communication network, facilitate performance of operations, comprising monitoring a first downlink control channel search space; at block 1110 blindly decoding the first downlink control channel search space; at block 1115 determining second downlink control channel search space information from the blindly decoded first downlink control channel search space; at block 1120 monitoring a second downlink control channel search space according to the second downlink control channel search space information; at block 1125 decoding the second downlink control channel search space according to the second downlink control channel search space information; at block 1130 determining scheduling information for a data traffic flow from the decoded second control channel search space; at block 1135 decoding the data traffic flow according to the scheduling information; at block 1140 decoding the data traffic flow according to the scheduling information; wherein at block 1145 the mobile device is part of a service-type-specific group of mobile devices that are configured to monitor and decode the first downlink control channel search space according to device-specific scrambling codes. At block 1150 the executable instruction further facilitate monitoring a wake up indication control channel search space; at block 1155 determining wake up information from the wake up indication control channel search space; at block 1160 blindly decoding the wake up information using a service-type-specific scrambling code; at block 1165 analyzing the blindly decoded wake up information to result in analyzed decoded wake up information; and at block 1170 responsive to the analyzing of the blindly decoded wake information, changing the mobile device from an idle mode to an active mode based on a determination that analyzed decoded wake up information comprises an instruction for the mobile device to wake up.

Figure 12:
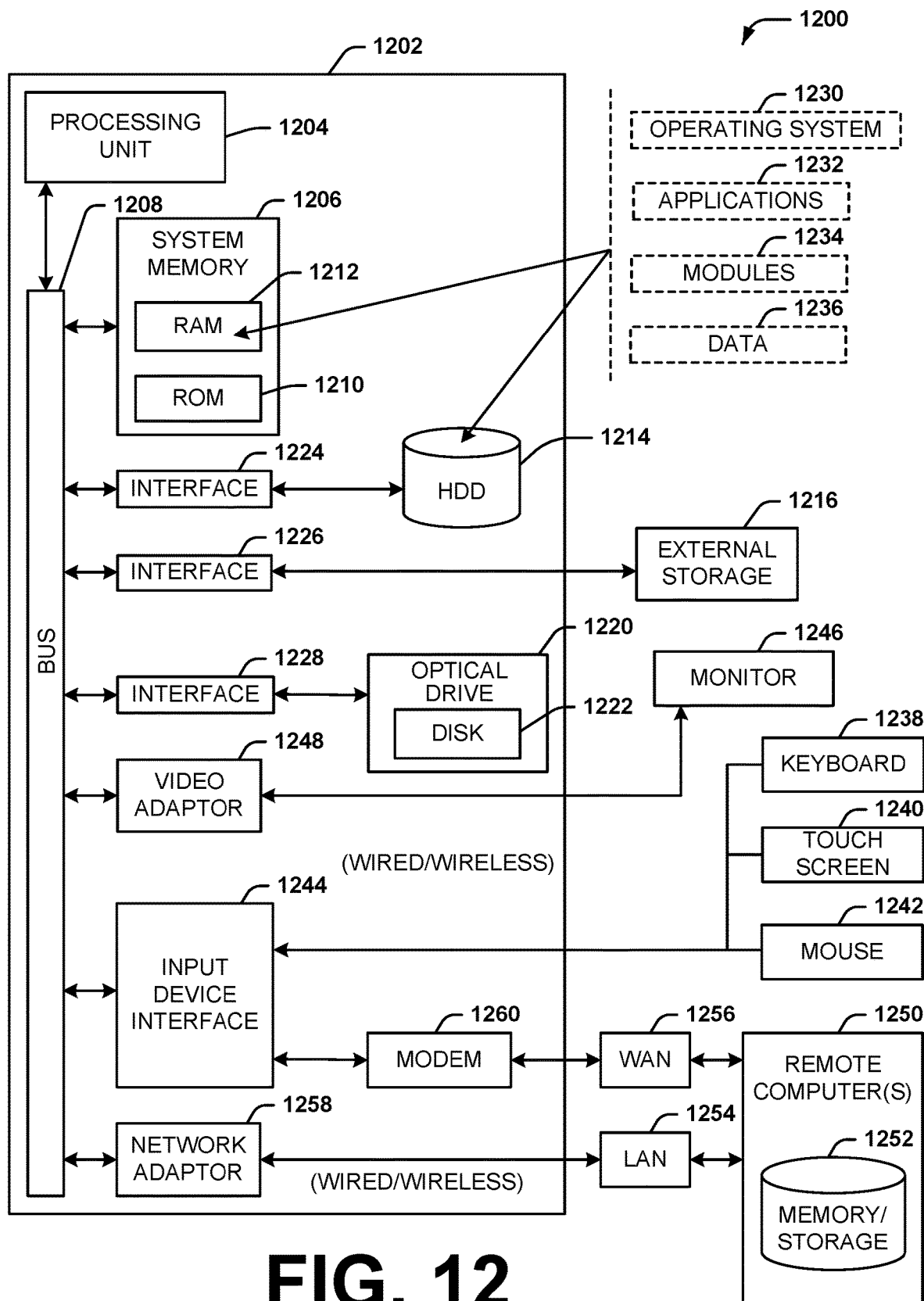
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
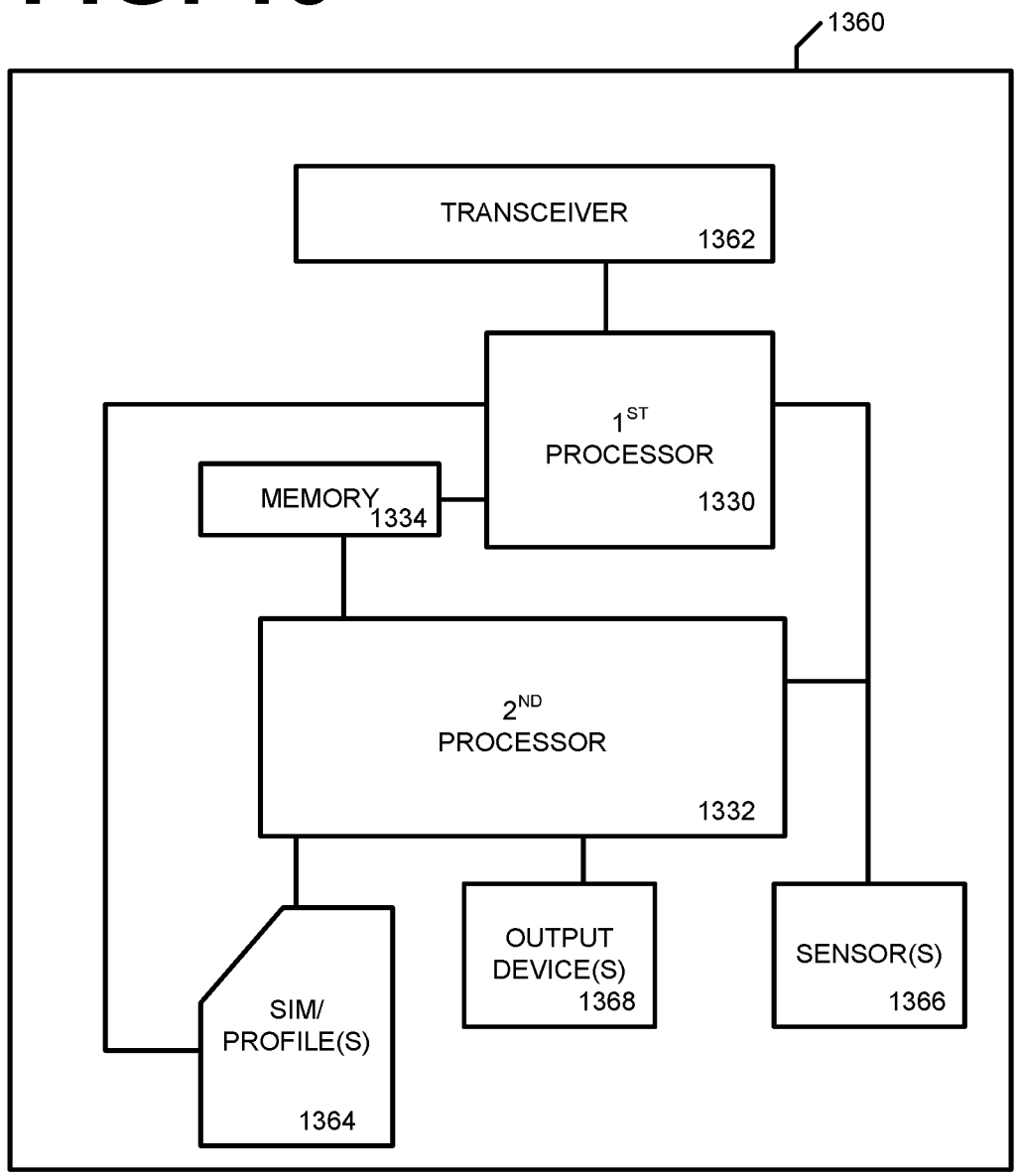
FIG. 13 illustrates a block diagram of an example wireless UE.

Turning to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMS") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   monitoring, by a user equipment comprising a processor, a first downlink control channel search space;
   blindly decoding the first downlink control channel search space, resulting in a blindly decoded first downlink control channel search space;
   retrieving second downlink control channel search space information from the blindly decoded first downlink control channel search space;
   monitoring a second downlink control channel search space according to the second downlink control channel search space information, wherein the first downlink control channel search space does not comprise the second downlink control channel search space;
   based on the second downlink control channel search space information retrieved from the blind decoding of the first downlink control channel search space, decoding the second downlink control channel search space to obtain traffic scheduling information, wherein the second downlink control channel search space information retrieved from the blind decoding of the first downlink control channel search space is indicative of scheduling and transmission information that is usable to decode the second downlink control channel search space and that comprises at least one of: at least one time resource; at least one frequency resource; at least one periodicity; at least one frequency range; at least one physical downlink control channel aggregation level; at least one modulation and coding scheme; or at least one inter-user-equipment multiplexing information; and
   decoding the data traffic flow according to the traffic scheduling information.

2. The method of claim 1, wherein the scheduling information for the data traffic flow is second scheduling information for a second data traffic flow, wherein the first downlink control channel search space comprises first scheduling information that corresponds to a first data traffic flow having a first characteristic, and wherein the second data traffic flow corresponds to a second characteristic.

3. The method of claim 2, wherein the first characteristic comprises a first quality of service that is associated with a first latency, wherein the second characteristic comprises a second quality of service that is associated with a second latency, and wherein the second latency is greater than the first latency.

4. The method of claim 1, wherein the scheduling information for the data traffic flow is second scheduling information for a second data traffic flow, and further comprising:
   retrieving first scheduling information for a first data traffic flow from the first downlink control channel search space; and
   decoding the first data traffic flow according to the first scheduling information.

5. The method of claim 1, wherein the user equipment is part of a service-type-specific group of user equipment's that are configured to monitor and decode the first downlink control channel search space according to device-specific scrambling codes.

6. The method of claim 5, further comprising:
   monitoring a wake-up indication control channel search space;
   retrieving wake up information from the wake-up indication control channel search space;
   blindly decoding the wake-up information using a service-type-specific scrambling code, resulting in blindly decoded wake up information;
   analyzing the blindly decoded wake up information to result in analyzed decoded wake up information; and
   responsive to the analyzing the blindly decoded wake information, changing the user equipment from an idle mode to an active mode based on a determination that the analyzed decoded wake up information comprises an instruction for the user equipment to wake up.

7. The method of claim 1, wherein the user equipment is part of a service-type-specific group of user equipment's that are configured to blindly decode the first downlink control channel search space according to a service-type-specific scrambling code, wherein the second downlink control channel search space information comprises a device-specific-scrambling code that is specific to the user equipment, and wherein the user equipment uses the device-specific-scrambling code to perform the decoding of the second downlink control channel search space.

8. The method of claim 7, further comprising:
   monitoring a wake-up indication control channel search space;
   retrieving wake up information from the wake-up indication control channel search space;
   blindly decoding the wake-up information using the service-type-specific scrambling code, resulting in blindly decoded wake up information;

analyzing the blindly decoded wake up information to result in analyzed decoded wake up information; and
responsive to the analyzing the blindly decoded wake-up information, changing the user equipment from an idle mode to an active mode based on a determination that the analyzed decoded wake up information comprises an instruction for the user equipment to wake up.

9. A user equipment, comprising:
a processor configured to:
monitor a first downlink control channel search space;
blindly decode the first downlink control channel search space, resulting in a blindly decoded first downlink control channel search space;
obtain second downlink control channel search space information from the blindly decoded first downlink control channel search space;
monitor a second downlink control channel search space according to the second downlink control channel search space information, wherein the second downlink control channel search space is different than the first downlink control channel search space;
based on the second downlink control channel search space information obtained from the blind decoding of the first downlink control channel search space, decode the second downlink control channel search space;
obtain scheduling information for a data traffic flow from the second downlink control channel search space; and
decode the data traffic flow according to the scheduling information.

10. The user equipment of claim 9, wherein a first characteristic, corresponding to the first downlink control channel search space, comprises a first quality of service that is associated with a first latency, wherein a second characteristic, corresponding to the second downlink control channel search space, comprises a second quality of service that is associated with a second latency associated with the traffic, and wherein the second latency is longer than the first latency.

11. The user equipment of claim 9, wherein the scheduling information for the data traffic flow is second scheduling information for a second data traffic flow, and wherein the processor is further configured to:
obtain first scheduling information for a first data traffic flow from the first downlink control channel search space; and
decode the first data traffic flow according to the first scheduling information.

12. The user equipment of claim 9, wherein the user equipment is part of a service-type-specific group of user equipment that are configured to monitor and decode the first downlink control channel search space according to device-specific scrambling codes.

13. The user equipment of claim 12, the processor being further configured to:
monitor a wake-up indication control channel search space;
obtain wake up information from the wake-up indication control channel search space;
blindly decode the wake-up information using a service-type-specific scrambling code, resulting in blindly decoded wake up information;
perform an analysis of the blindly decoded wake up information to result in analyzed decoded wake up information; and
based on a result of the analysis of the blindly decoded wake information, change the user equipment from an idle mode to an active mode based on a determination that the analyzed decoded wake up information comprises an instruction for the user equipment to wake up.

14. The user equipment of claim 9, wherein the user equipment is part of a service-type-specific group of user equipment that is configured to blindly decode the first downlink control channel search space according to a service-type-specific scrambling code, wherein the second downlink control channel search space information comprises a device-specific scrambling code that is specific to the user equipment, and wherein the user equipment uses the device-specific-scrambling code to perform the decoding of the second downlink control channel search space.

15. The user equipment of claim 14, the processor being further configured to:
monitor a wake-up indication control channel search space;
obtain wake up information from the wake-up indication control channel search space;
blindly decode the wake-up information using the service-type-specific scrambling code, resulting in blindly decoded wake up information;
perform an analysis of the blindly decoded wake up information to result in analyzed decoded wake up information; and
based on a result of the analysis of the blindly decoded wake up information, change the user equipment from an idle mode to an active mode based on a determination that the analyzed decoded wake up information comprises an instruction for the user equipment to wake up.

16. A non-transitory machine-readable medium, comprising executable instructions that, when executed by a processor of a mobile device coupled with a communication network, facilitate performance of operations, comprising:
monitoring a first downlink control channel search space;
blindly decoding the first downlink control channel search space;
determining second downlink control channel search space information, usable to decode at least one second downlink control channel search space, from the blindly decoded first downlink control channel search space, wherein the at least one second downlink control channel search space is different than the first downlink control channel search space;
monitoring the at least one second downlink control channel search space according to the second downlink control channel search space information;
based on the second downlink control channel search space information determined from the blind decoding of the first downlink control channel search space, decoding the at least one second downlink control channel search space according to the second downlink control channel search space information, wherein the second downlink control channel search space information is indicative of scheduling and transmission information that is usable to decode the at least one second downlink control channel search space and that comprises at least one of: at least one time resource; at least one frequency resource; at least one periodicity; at least one frequency range; at least one physical downlink control channel aggregation level; at least one modulation and coding scheme; or at least one inter-user-equipment multiplexing information;

determining traffic scheduling information for a data traffic flow from the at least one second control channel search space; and decoding the data traffic flow according to the traffic scheduling information.

17. The non-transitory machine-readable medium of claim 16, wherein the mobile device is part of a service-type-specific group of mobile devices that are configured to monitor and decode the first downlink control channel search space according to device-specific scrambling codes.

18. The non-transitory machine-readable medium of claim 17, wherein the operations further comprise:

monitoring a wake-up indication control channel search space;

determining wake up information from the wake-up indication control channel search space;

blindly decoding the wake-up information using a service-type-specific scrambling code;

analyzing the blindly decoded wake up information to result in analyzed decoded wake up information; and responsive to the analyzing of the blindly decoded wake information, changing the mobile device from an idle mode to an active mode based on a determination that analyzed decoded wake up information comprises an instruction for the mobile device to wake up.

19. The non-transitory machine-readable medium of claim 16, wherein the mobile device is part of a service-type-specific group of mobile devices that is configured to blindly decode the first downlink control channel search space according to a first service-type-specific scrambling code, wherein the second downlink control channel search space information comprises a device-specific-scrambling code that is specific to the mobile device, and wherein the mobile device uses the device-specific-scrambling code to perform the decoding of the second downlink control channel search space.

20. The non-transitory machine-readable medium of claim 19, wherein the operations further comprise:

monitoring a wake-up indication control channel search space;

determining wake up information from the wake-up indication control channel search space;

blindly decoding the wake-up information using a second service-type-specific scrambling code;

analyzing the blindly decoded wake up information to result in analyzed decoded wake up information; and responsive to the analyzing of the blindly decoded wake up information, changing the mobile device from an idle mode to an active mode based on a determination that the analyzed decoded wake up information comprises an instruction for the mobile device to wake up.

* * * * *